July 11, 1944.  J. R. LEISURE  2,353,252
NUT ANCHOR
Filed Aug. 10, 1942
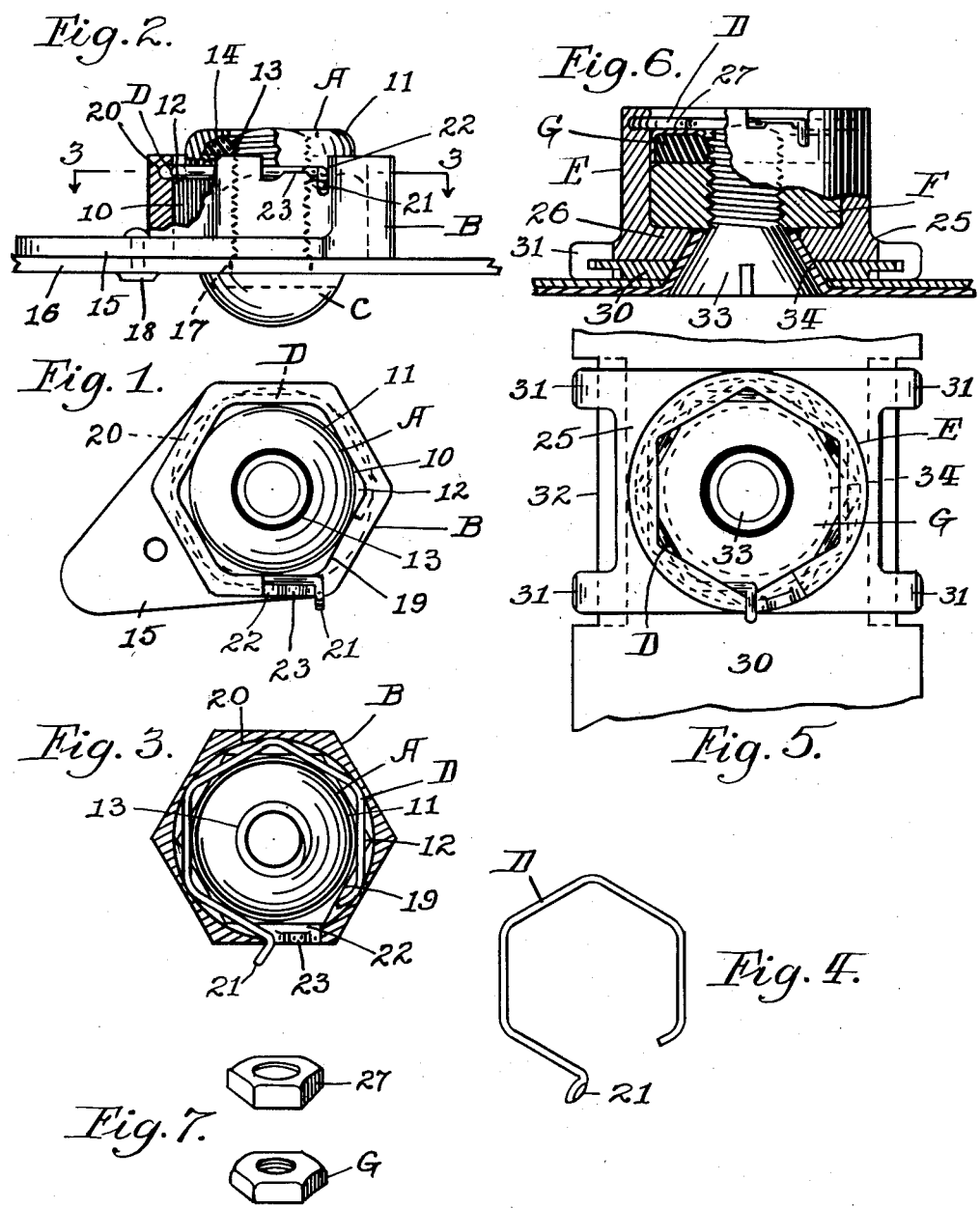
INVENTOR.
James R. Leisure,
BY
Attorney.

Patented July 11, 1944

2,353,252

UNITED STATES PATENT OFFICE 2,353,252

NUT ANCHOR

James R. Leisure, Compton, Calif.

Application August 10, 1942, Serial No. 454,266

12 Claims. (Cl. 85—32)

This invention relates to improvements in nut anchors and more particularly to that type by which a nut is removably held so that a screw, bolt or other fastener can be easily and quickly attached and which also readily permits the removal or replacement of the nut including its clinching element when the latter is employed. This application is a continuation in part of my companion applications Serial Number 420,169, filed November 24, 1941, and Serial Number 449,289, filed July 1, 1942. The present improvement provides nut retaining means which without removal can be easily adjusted so as to either retain or discharge the nut, whereas the structures set forth in my companion applications require the removal of the nut retaining means from the socket member in order to permit the removal of the nut. With the present invention the nut retaining element is not liable to be lost, nor is the present invention subject to waste of time, labor and expense by the necessity of removing and replacing the retainer as heretofore. The nut is held firmly and securely by my improved nut anchor but when desired the nut can be easily and quickly removed and replaced by a fresh nut through simple adjustment of the retainer. My improved nut anchor is adapted to be fastened on any structure to which it is desired to directly or indirectly secure a bolt, screw or other fastener and is particularly although not exclusively useful in aircraft, automobile and other structural and fabrication work.

Among the principal objects of the invention are simplicity and inexpensive construction and greater effectiveness in use.

The various figures of the drawing show adaptations of my improved nut anchor and modifications thereof. In the drawing forming part of this specification, Fig. 1 is a plan of my improved nut anchor, the retainer being shown in nut releasing position; Fig. 2 is an elevational view of the structure shown in Fig. 1, a portion of the socket shell being broken away and in section to expose a portion of the retainer; Fig. 3 is a section taken on the line 3—3 of Fig. 2, when the retainer is in normal nut retaining position; Fig. 4 is a plan of the nut retainer; Fig. 5 is a plan of an alternative construction, showing the socket shell suitably constructed for use on a gang clip; Fig. 6 is a central vertical section, a portion of the socket shell being shown in full side elevation; and Fig. 7 illustrates perspectively at reduced scale, the elastic clinching element employed in the construction contained in Figs. 5 and 6.

In the drawing, I have shown my invention applied for use with a nut which has a self contained clinching annulus (Figs. 1 to 4 inclusive), and also with a nut and clinching element which are separate and distinct (Figs. 5 and 6), but are cooperatively held by my improved socket shell and retainer. Referring particularly to Figs. 1 to 4 inclusive, A represents the nut having a flat sided body 10 (hexagonal in cross section), an annular neck 11, and an intervening shoulder 12. The nut contains the usual threaded bore 13 and has a conventional inner clinching annulus 14 composed of tough elastic material such as pressed vulcanized fiber inserted in the wall of the upper end of the bore of the nut so that when the shank of a screw, bolt or other fastener, such as C is screwed into the nut the clinching annulus is penetrated by the thread of the fastener to prevent or retard the nut from turning and loosening from the shank of the screw or bolt.

My invention includes an outer socket shell B having an upstanding continuous enclosing wall and a supporting base 15 of any suitable construction. The base is adapted to be fastened on any object with which the nut shell is used, such for illustration as the structural plate 16, having a bolt receiving opening 17 with which the shell registers. The fastening means may be rivets such as 18, bolts, screws etc. As shown the outer surface of the wall of the shell is polygonal flat sided but it may be of any desired contour. The inner surface of the wall is flat sided at 19 to correspond with and engage the flat sides of the body of the nut A. As illustrated the inner surface of the wall of the shell is hexagonal and corresponds in size and shape with the nut so that the latter seats freely and is securely held from turning in the socket thus provided. This shape may be variously modified or any other suitable cooperating intervening means for preventing the nut from turning in the socket provided. The wall of the socket shell extends above the body of the nut sufficiently to permit of providing a circular inner channel 20 in which the split resilient nut retaining collar D is adapted to engage over the nut to prevent normal removal thereof from the shell. The retaining collar is polygonal sided and corresponds in shape and size with the shape and size of the socket shell to normally seat flush with the inner surface of the latter. One end of the split portion of the retaining collar has a radiating hand operating arm 21 and the wall of the socket shell has a segmental slot 22 registering with the circular channel 20. The retaining collar is rotatively seated in the circular channel 20 with its arm 21 radiating outwardly through the slot 22 so that by propelling the arm 21 circumferentially by hand the retainer can be freely swung into either of two positions, one when the nut is blocked from removal through the outer end of the nut socket shell (see Fig. 3), and the other when the nut is released and can be discharged (see Fig. 1).

In nut discharging position (see Fig. 1) the retaining collar is wholly seated in the circular channel below and coincident with the inner surface of the polygonal flat sided inner wall of the nut shell so that the nut is unobstructed and is free to be removed through the outer end of the socket shell. When returned from open position the distance permitted by the comparatively short segmental slot 22 into normal position shown in Fig. 3, the retaining collar engages over the angles or corners of the annular shoulder 12 and blocks the nut to prevent removal from the socket shell. A shoulder 23 on the floor of the slot 22 serves to restrain the retainer locked in either of its two positions.

Thus, the retaining collar normally intercepts the nut against removal from the socket shell and the screw, bolt or other fastener can be engaged with or disengaged from the nut. By shifting the retainer into open position through a short arc, the nut can be easily removed or discharged from the socket shell or replaced without bodily removing the retainer.

In Figs. 5 to 7 inclusive, the nut socket shell E is of cylindrical shape and has a substantially flat exterior base 25 and a lower inner shoulder 26 upon which the nut element F is supported instead of on the structural plate 16 as shown in Fig. 2. The nut element is conventional, as shown, its body being of hexagonal shape. This nut body engages the corresponding inner flat side walls of the socket shell to prevent turning. Associated with this nut body is a separate and distinct clincher nut body G, composed of pressed vulcanized fiber or other suitable material, having flat sides corresponding with and engaging the inner flat sides of the socket shell to prevent turning. The clincher nut G is held within the thin reinforcing jacket 27 (see Fig. 6), made of metal or other suitable material to reinforce and restrain the clinching nut from breaking or cracking when the shank of the screw or bolt is screwed tightly thereinto. The retaining collar D is of substantially similar construction as above described and functions as a retainer without detachment for removably holding the nut and clincher elements in the socket shell. In Fig. 7 the upper view shows the blank thread clinching nut before it is engaged by a screw thread and the lower view shows the blank nut after it has been engaged and the threaded shank of the bolt 33 removed. The clincher nut body need not be encased in a metal jacket when desired and it is contemplated that the clincher and threaded nuts can be employed in a nut holding shell wherein an inner shoulder 26 is omitted and the threaded nut rests directly upon a base or other support below the shell. The base 25 is shown mounted upon a gang clip 30, with inwardly directed engagements 31 over the side edges 32 of the clip and having limited movement both laterally and longitudinally to permit registration of the shank of the bolt such as 33 passing through openings such as 34 in the clip. As shown the structure is of such conventional type as to permit the head of the bolt 32 or other fastener being recessed so that the ultimate structure provides a flush surface below the head of the fastener and the structural plates which are secured through the use of the socket shell and the cooperating fastener. In the above structures the nuts including the clinching element and socket shell may have one or any number of flat engaging sides or other engaging means within the spirit of the invention.

In accordance with the patent statutes, I have described the principles of operation of my invention together with the construction thereof which represents an embodiment thereof but I desire to have it understood that the structure shown is only illustrative and that the invention can be carried out by other means and applied to uses other than those above set forth within the spirit of the invention and within the scope of the following claims.

I claim:

1. A nut anchor structure, comprising, a nut, a socket shell having a continuous wall for holding the nut and from which the nut is removable through its outer end, said nut and the wall of said shell having cooperating engaging means by which the nut is retained from rotating in said shell, and a retaining element engaged in the wall of said shell and movable into two positions, one normally blocking the removal of the nut and the other permitting its removal through the outer end of said shell.

2. A nut anchor structure, comprising, a nut, a socket shell having a continuous wall in which the nut is removably held, said nut and the wall of said shell having cooperating engaging means by which the nut is restrained from rotating in the shell, and a retainer rotatively seated in the wall of said shell and movable into two positions, one normally blocking the removal of the nut through the outer end of said shell and the other permitting the removal of the nut through the outer end of the shell.

3. A nut anchor structure, comprising, a nut body, a socket shell having a continuous wall in which the nut body is removably held, said nut body and the wall of said shell having cooperating engaging means by which the nut body is restrained from rotating in the shell, a retainer rotatable in said shell into two positions, one blocking the removal of the nut body from the shell and the other permitting the removal of the nut body through the outer end of the shell, and means for releasably restraining the retainer from unintentional rotative movement.

4. A nut anchor structure, comprising, a nut, an anchor shell having a continuous wall open through its outer end for holding said nut, said nut and the wall of said anchor shell having cooperating means by which the nut is restrained from rotating in the shell, and the wall of said shell having an inner annular channel above the nut, and a retainer rotatively seated in said channel normally blocking the removal of the nut and rotative into a position permitting the free removal of the nut through the outer end of the shell.

5. A nut anchor structure, comprising, a nut having a flat sided body, a socket shell having a continuous wall formed with a flat sided bore corresponding with the body of the nut and open through its outer end to freely receive and restrain the nut from rotating and having an annular channel in its inner surface below its outer end, and a flat sided retainer rotatively seated in said channel and corresponding with said bore so as to permit the free removal of the nut through the outer end of the socket shell in one rotative position and to normally block the removal of the nut through the outer end of the socket shell when rotated, said retainer having a hand engaging end projecting through the wall of said socket shell by which it can be rotated.

6. In a structure as defined in claim 5, the nut having an annular shoulder above its body over which said retainer engages to normally block the removal of the nut through the open end of said socket shell.

7. An anchor for a nut which has a flat sided body, comprising, a nut holding socket shell bounded by a continuous wall having an inner surface composed of flat surfaces corresponding with the sides of said body to engage and prevent the nut from rotating, a normally open upper end through which the nut is removable having an annular channel in its surface and a retainer rotatively seated in said channel and corresponding with the inner surface of said socket shell, said retainer in one position permitting the discharge of the nut through the open end of said shell and when rotated intercepting and holding the nut in said shell.

8. An anchor for a nut which has a flat sided body, comprising, a nut holding socket shell bounded by a continuous wall having an inner surface composed of flat surfaces corresponding with the sides of said body to engage and prevent the nut from rotating, a normally open upper end through which the nut is removable having an annular channel in its inner surface, a shoulder in the lower end of the socket shell for supporting the nut, and a retainer rotatively seated in said channel and corresponding with the inner surface of said socket shell, said retainer in one position permitting the discharge of the nut through the open end of the shell and when rotated intercepting and holding the nut in said shell.

9. In a nut anchor structure, a nut body, a socket shell for holding the nut body bounded by a continuous wall open through its outer end for the passage of the nut body, said nut body and the wall of said socket shell having cooperating means for preventing the rotation of the nut body in said shell, and said socket shell having an annular channel in its outer end beyond the nut body, a retainer seated in said channel in a position permitting the free passage of the nut body in said socket shell and movable into normal position obstructing the removal of the nut body through the outer end of said socket shell, and a clip upon which said socket shell is movable to permit ready adjustment of the socket shell thereon.

10. In a nut anchor structure, a nut body, a socket shell for holding the nut body bounded by a continuous wall open through its outer end for the free passage of the nut body, said nut body and the wall of said socket shell having cooperating angularly disposed sides for preventing the rotation of the nut body in said shell, and said socket shell having a laterally disposed channel in its outer end beyond the nut body, and a retaining collar seated in said channel having angularly disposed sides which in one rotative position of the collar permits the free passage of the nut body through the outer end of said socket shell and in another rotative position of the collar when the nut body is seated in said shell engages over the angular portions of the nut body to retain the nut body in said shell.

11. In a nut anchor structure, a socket shell provided with a polygonal bore and having means for supporting the same on a base, a threaded nut placed in said socket shell and an independent shank clinching blank nut placed ahead of said threaded nut in said socket shell, said nuts having polygonal sides corresponding with the inner surface of said bore to prevent rotation when a shank is threadedly engaged with both of said nuts and nut retaining means movably engaged in said shell normally holding the nuts in the shell and movable into a position in which the nuts can be removed.

12. In a nut anchor structure, a socket shell having a continuous wall, an opening in its lower end for receiving a threaded shank, a polygonal bore and a lateral support in said socket shell, a threaded nut placed in said bore, an independent shank clinching blank nut superimposed freely upon said threaded nut in said bore, said nuts having polygonal sides corresponding with the inner surfaces of said bore to prevent rotation of the nuts when the shank is threadedly engaged therein, and nut retaining means movably engaged with said socket shell over said nuts for normally preventing the removal of the nuts through the outer end of said bore, said nut retaining means being movable while engaged by the shell into a position whereby the nuts are permitted to be removed.

JAMES R. LEISURE.